Jan. 23, 1951  E. W. FINDLAY  2,539,124
TUBE CUTTING DEVICE
Filed April 15, 1949  2 Sheets-Sheet 1

INVENTOR.
ELWOOD W. FINDLAY
BY
Christian L. Nielsen.
ATTORNEY.

Jan. 23, 1951  E. W. FINDLAY  2,539,124
TUBE CUTTING DEVICE

Filed April 15, 1949  2 Sheets-Sheet 2

INVENTOR.
ELWOOD W. FINDLAY
BY
Christian R. Nielsen
ATTORNEY.

Patented Jan. 23, 1951

2,539,124

UNITED STATES PATENT OFFICE 2,539,124

TUBE CUTTING DEVICE

Ellwood W. Findlay, Milwaukee, Wis.

Application April 15, 1949, Serial No. 87,788

3 Claims. (Cl. 30—92)

My invention relates to improvements in tube cutting devices and more particularly to a device for severing metallic tubing.

The object of my invention is to provide a device that will cut the wall of the tube, by means of a shearing action.

Another object of my invention is to provide a device that will pierce a portion of the tube wall and shear the balance of the wall from the inside of the tube.

Still another object of my invention is to provide a device that will not crush or collapse the tube during the cutting operation.

A further object of my invention is to provide a device that will produce a clean cut edge, without the danger of burring the walls of the tube.

A still further object of my invention is to provide a device that may be constructed in a portable manner, thereby making it possible to apply the cutting tool to the tube to be cut, when the tube is permanently installed in a fixed position.

It is manifest to anyone familiar with the art, that thin walled tubes are usually cut by means of a saw, and that in many instances it is impossible to use a saw for severing the tube due to the limited space when the tube is installed in a fixed position, and when the tube is not sawed, it is common practice to use a rotating cutter. This cutter or this sawing operation when applied to the peripheral outer surface of the tube, is prone to produce an inside burr or obstruction which is detrimental to material inserted into the tube, or may cause an obstruction to the flow of liquid when passing through the tube.

My device as described and claimed herein provides a means of cutting the tubing from the inside thereby leaving a smooth clean edge and inner surface.

The manipulation of the device requires a minimum of effort due to the leverage provided, and the portability of the tool makes for a convenient handy tool that is simple in construction and efficient for the purpose for which it is intended.

Other and further objects of my invention will become more apparent as the description proceeds when taken in conjunction with the drawings in which Figure 1 is a side view of the device with the jaws in an open position and with the tube shown in cross-section.

Figure 1:
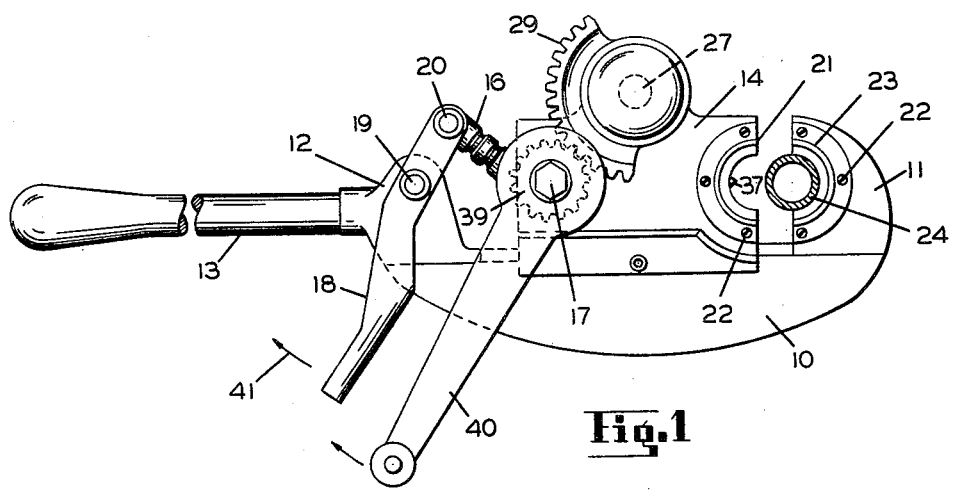

Similar characters of reference indicate corresponding parts throughout the several views and referring now to the same, the character 10 shows a frame structure having a stationary jaw 11, integrally formed at its forward end and a handle support 12 integrally formed with the frame structure 10 at the rearward end.

The handle 13 may be an integral portion of the frame 10, or it may be threadedly inserted or attached in any other convenient and efficient manner. It is also obvious that the handle 13 may be of any desired shape or length to provide the required leverage and convenience.

There is a movable block 14, slideably mounted into the frame 10 and slideably engages the frame 10 within the groove 15. This block 14 has a link member 16 pivotally connected to the block 14 by means of the shaft 17, and a clamping lever 18 is pivotally mounted to the frame 10 by means of the pin 19, and to the other end of the link member 16 at 20. The movable block 14 is provided with a slotted semi-circular clamp member 21 shown attached thereto by means of screws 22, or in any other convenient and efficient manner, while the stationary jaw 11 has a similar corresponding semi-circular slotted clamp member 23, attached by means of the screws 22. This clamp 23 registers with the member 21 and is in direct alignment therewith. The members 21 and 23 are removable and may be replaced by a set of members of a size to accommodate the outer peripheral surface of the tube which is shown as 24, to be cut or severed.

The upper portion of the movable block 14 is provided with a hollow portion 25 which encases a gear 26 mounted to a shaft 27, by means of a key 28 or in any other convenient manner. The shaft 27 is journaled within bearings in the portion 25 and has one end extending outward therefrom for rigidly supporting a quadrant shown as 29, which quadrant is provided with gear teeth on its outer peripheral surface for engagement with the gear 26. There is a blade support 30 slidably mounted within the movable block 14. This blade support 30 is slidably supported at its lower edge 31 and its upper edge is provided with a gear rack shown as 32 for engagement with the gear 26, which is mounted on a shaft 27. The readward end of the support 30 has an inwardly extending groove 33 and a blade 34 is mounted to the forward end of the support 30, by means of the screws 35. The blade 34 has its rearward flat edge in direct engagement with an outwardly extending ledge 36 forming an integral part of the support 30. The forward end of the blade 34 is equipped with a sharp pointed portion shown as 37, which is employed for piercing the tube 24. This point 37 tapers backward radially at 38 from the outer edge of the piercing point to the full width of the blade 34. Obviously the width of the blade 34 will determine the diameter of the tube that may be cut or severed.

The shaft 17 extends outward from the block 14 at one side, and has a gear 39 mounted thereon, and the extreme outwardly extending end of the shaft 17 is shown having a crank handle 40 attached thereto.

Figure 2:
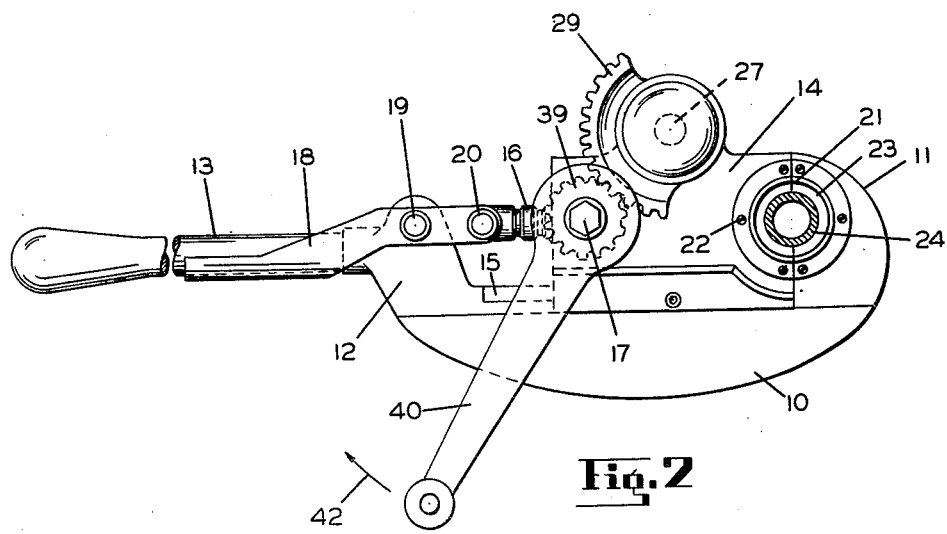
Figure 2 is a similar view of the device with the jaws in a closed position showing the tube clamped ready for shearing.
Figure 3:
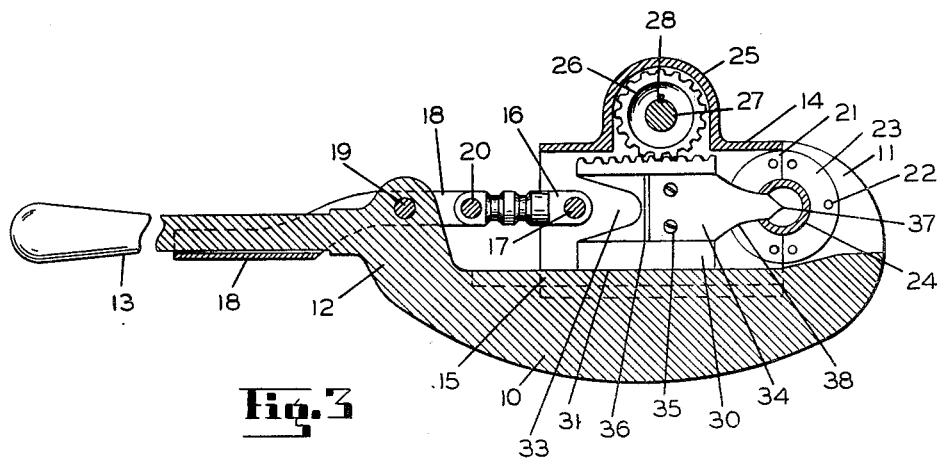
Figure 3 is a cross-section of the device as shown in Figure 2, with the shearing blade piercing the wall of the tube
Figure 4:
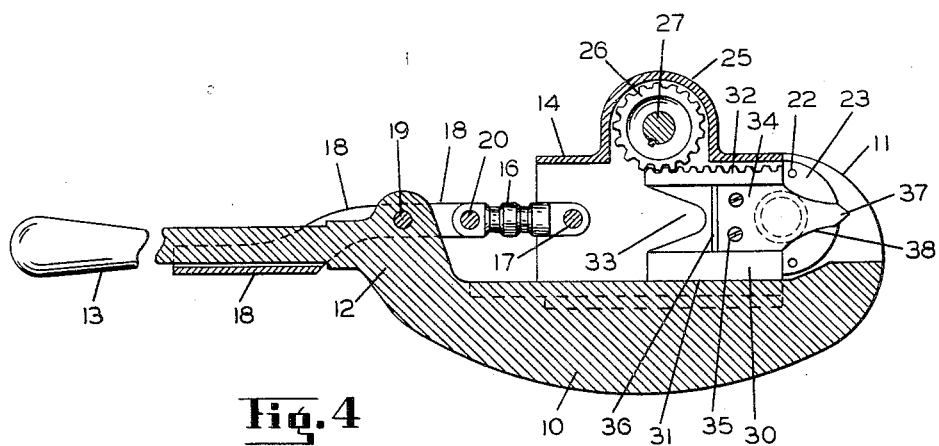
Figure 4 is a similar cross-sectional view of the device as shown in Figure 2, with the shearing blade passed through the entire diameter of the tube.

The operation of the device is extremely simple and functions as follows:

To open the jaws so that the tube 24 to be cut may be clamped by the semicircular clamping members 21 and 23, it is necessary to move the lever 18 downward away from the handle 13 as shown in Figure 1, and as the lever 18 is brought back in the direction indicated by the arrow 41 in Figure 1 toward the handle 13 into the position shown in Figure 2, the clamping members 21 and 23 will encircle the outer periphery of the tube 24 and obviously must be of the same radial contour. The lever 18 actuates slideably the movable blocks 14 by means of the link 16. With the tube 24 securely supported, the lever 40, when moved upward as indicated by the arrows 42 in Figure 2, will cause the sharp pointed portion 37 of the blade to pierce the wall of the tube 24 as in Figure 3 due to the movement of the blade actuated by the gear 26 in its contact with the rack 32, and as the blade is further forced forward it will provide a shearing action of its edges 38 from the inside of the tube until the shearing blade 34 passes through the entire tube as shown in Figure 4. The lever 18 may then be brought down to the position away from the handle 13, as shown in Figure 1 and at this position the severed tube 24 will be released by the clamping members 21 and 23. The fact that the wall of the tube is pierced from the outside at only one place and sheared the balance of its entire cross-section from the inside by one continuous action, produces a smooth clean cut.

While I have shown a particular arrangement of the parts constituting the device, I am fully cognizant of the fact that the component parts may be varied in shape and contour from the specific instructions shown, without departing from the spirit of my invention or the scope of the appended claims.

Having thus described my invention, what I claim and desire to secure by Letters Patent in the United States is:

1. A tube cutting device comprising, a body member constituting a frame, a stationary jaw and handle support extending upwardly from said frame, a longitudinally disposed handle member extending outwardly from said handle support, a movable block disposed between said stationary jaw and handle support said block slideably mounted in said frame, a clamping lever hingedly attached to the handle support, said lever having its rearward portion extending longitudinally with said handle, a link member pivotally attached at one of its ends to the movable block, the other one of its ends attached to the said clamping lever, a slotted semi-circular clamp member attached to the forward face of said movable block, another slotted semi-circular clamp member attached to said stationary jaw, both of said semi-circular clamp members being radial in construction and disposed in direct alignment with one another in their contact with the tube to be cut, said movable block having a hollow portion, a shaft extending through said hollow portion, and outward therefrom at one of its ends, the outwardly extending end of said shaft equipped with a quadrant provided with gear teeth on its periphery, a spur gear disposed within the hollow portion of said movable blocks, said gear rigidly mounted to said shaft, a slideably mounted blade support disposed within said movable block, a rack on the edge of said blade support for engagement with said gear, a blade, said blade having an angularly disposed piercing point at its forward end and having its shearing edges radially disposed from said piercing point to the outer edges of said blade, means for attaching said blade to said blade support, an auxiliary shaft journaled within said movable block, said shaft extending outward at one end therefrom, a gear mounted to the extending end of said shaft, said gear arranged for engagement with said quadrant, and means for revolving said auxiliary shaft thereby moving said blade support and blade through the contact of said gears and quadrant.

2. A tube cutting device comprising, a frame member, a stationary jaw and handle support extending upward from said frame member, a handle engaging said handle support, a movable block disposed between said stationary jaw and handle support, said block slideably mounted to said frame, a clamping lever, said lever hingedly supported by said handle support, a link member pivotally attached at one end to said movable block and at the other end to said clamping lever, a pair of semi-circular slotted clamp members for engagement with the outer periphery of a tube to be cut, one of said members attached to the forward end of said movable block, the other member attached to the rearward face of said stationary jaw, both of said semi-circular clamp members disposed in direct alignment with one another when contacting the tube to be cut, said movable block having a hollow portion, a shaft extending through said hollow portion and outward therefrom at one of its ends, the outwardly extending end of said shaft equipped with a quadrant provided with gear teeth on its periphery, a spur gear disposed within the hollow portion of said movable block, said gear rigidly mounted to said shaft, a blade support slideably mounted within said movable block, said blade support equipped with a gear rack at its upper edge for engagement with the gear disposed within the hollow portion of said block, a blade, said blade having an angularly disposed piercing point at its forward end and its shearing edges radially disposed from said piercing point outward to the outer edges thereof, means for attaching said blade to said blade support, an auxiliary shaft extending through said movable block, said shaft provided with a gear for engagement with said quadrant, and means for revolving said auxiliary shaft thereby moving said blade support and blade due to the contact of said gear with said quadrant.

3. A device of the character described comprising in combination, a body member constituting a frame, said frame provided with a stationary jaw at its forward end and a handle support at its rearward end, a longitudinally disposed handle member extending outward from said handle support, a movable block slideably mounted onto said frame between said jaw and support, a clamping lever hingedly attached to said handle support, said lever having its rearward portion extending longitudinal with said handle, a link member, said link member pivotally attached at one end to said movable block and at the other end to said clamping lever, a semi-circular slotted clamp member attached to the forward face of said movable block, another semi-circular slotted clamp member attached to said stationary jaw, both of said semi-circular clamp members of hollow construction and disposed in direct alignment with one another, a shaft journaled within said movable block, said shaft extending outward therefrom, a gear mounted on said shaft within said movable block, the outwardly extending end of said shaft having a gear quadrant mounted thereon, a slideably mounted blade support disposed within said movable block, said blade support provided with a rack on its edge for engagement with said gear, a blade attached to said support, said blade provided with a piercing point at its forward end, the edges of said blade being radially disposed outward from said piercing point to the extreme outer edges of said blade, an auxiliary shaft journaled within said movable block, said shaft extending outward therefrom, a gear mounted to the outwardly extending end of said shaft, said gear arranged for engagement with said quadrant, and means for revolving said auxiliary shaft thereby moving said blade support and blade by the contact of said gear and quadrant.

ELLWOOD W. FINDLAY.

REFERENCES CITED

The following references are of record in the file of this patent:

UNITED STATES PATENTS

| Number | Name | Date |
| --- | --- | --- |
| 2,064,661 | Hammond | Dec. 15, 1936 |
| 2,230,529 | Daniels | Feb. 4, 1941 |
| 2,243,614 | Vogel | May 27, 1941 |